United States Patent [19]

Smith et al.

[11] Patent Number: 5,582,221
[45] Date of Patent: Dec. 10, 1996

[54] SEED DRILL FILLING APPARATUS

[75] Inventors: David R. Smith, Fort Jennings; William C. Maenle, Ottoville, both of Ohio

[73] Assignee: Unverferth Manufacturing Co., Inc., Kalida, Ohio

[21] Appl. No.: 7,123

[22] Filed: Jan. 21, 1993

[51] Int. Cl.⁶ ................. B67C 3/26; B67C 3/34
[52] U.S. Cl. ............ 141/250; 141/231; 141/256; 414/505
[58] Field of Search ............... 141/231, 232, 141/236, 250, 255, 256, 257; 414/501, 502, 503, 504, 505, 526, 518; 198/311, 312, 313, 632; 222/272, 273, 413, 412

[56] References Cited

U.S. PATENT DOCUMENTS

| | | | |
|---|---|---|---|
| 2,659,608 | 11/1953 | Topp | 414/503 |
| 2,746,621 | 5/1956 | McIntyre | 414/505 |
| 4,119,223 | 10/1978 | Flechter | 414/505 |
| 4,312,621 | 1/1982 | Quanbeck et al. | 414/523 |
| 4,390,094 | 6/1983 | Schoenberger | 414/504 |
| 4,669,945 | 6/1987 | Pollard et al. | 414/505 |
| 5,009,254 | 4/1991 | Bruner | 141/35 |

FOREIGN PATENT DOCUMENTS

| | | |
|---|---|---|
| 244311 | 7/1963 | Australia . |
| 113678 | 4/1969 | Denmark . |

*Primary Examiner*—Henry J. Recla
*Assistant Examiner*—Steven O. Douglas
*Attorney, Agent, or Firm*—Henderson & Sturm

[57] ABSTRACT

A lift auger and hopper extension assembly for use with a no-till or like seeder drill having an elongated seed hopper mounted laterally across the seeder drill. The assembly comprises a lift auger unit mounted on the seeder drill for movement about horizontal and vertical axes and movable on a slide mechanism from a storage position parallel alongside the seed hopper to a fill position with a fill hopper adjacent the ground and a spout unit poised above the center of the seed hopper, and the associated hopper extension mounted on top of the seed hopper for receiving and distributing an even flow of grain from the spout unit toward both ends of the seed hopper.

18 Claims, 4 Drawing Sheets

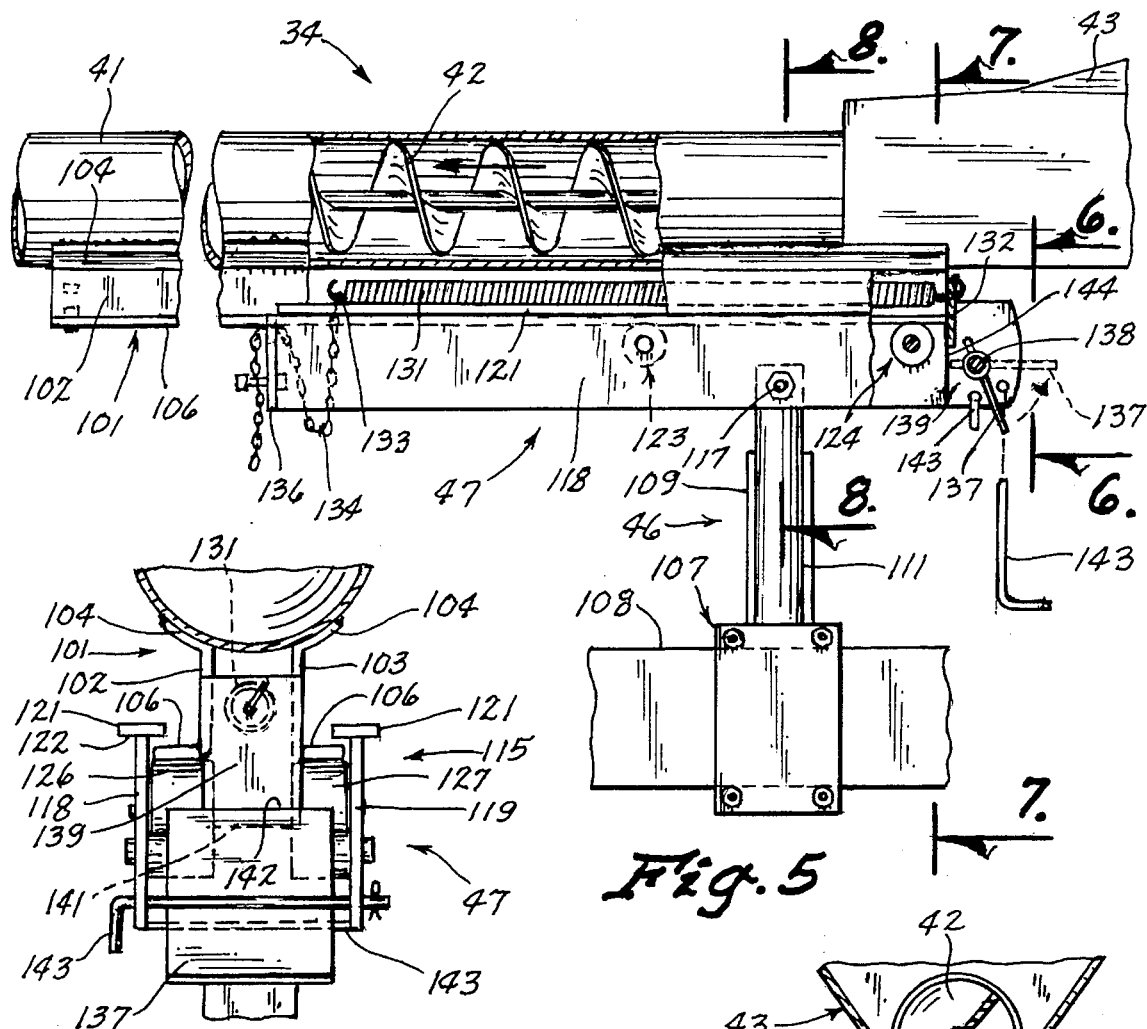
Fig. 5
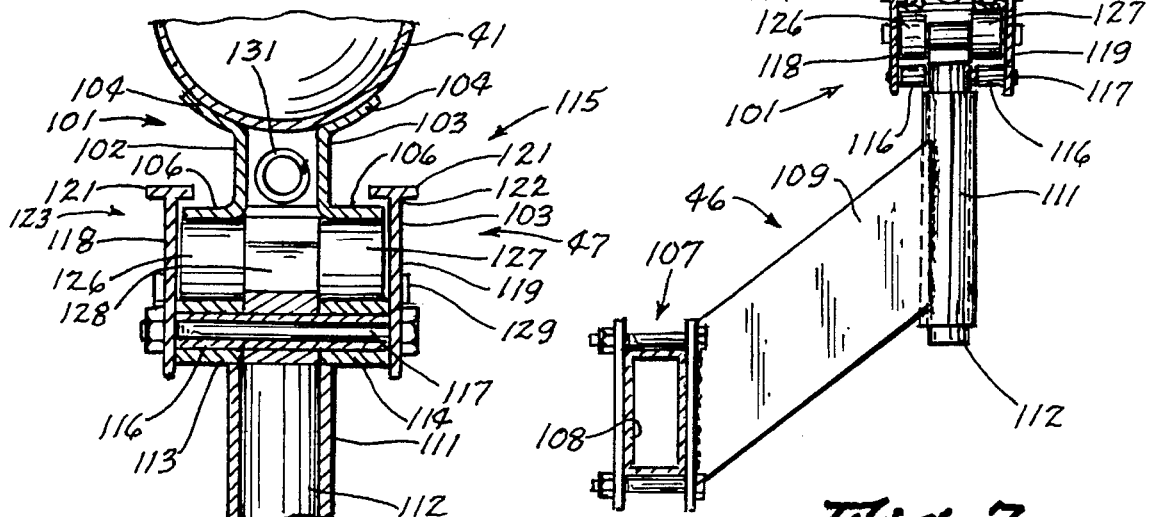
Fig. 6
Fig. 7
Fig. 8

SEED DRILL FILLING APPARATUS

TECHNICAL FIELD

The present invention relates to a lift auger and hopper extension apparatus for filling the seed tank of a seeder drill.

BACKGROUND ART

It is still common practice for a drill operator about to undertake field planting to fill the seed box of the drill by shoveling seed from a truck box or the like, or by carrying the seed in bags from a truck and dumping the seed at various locations along the long and narrow seed box of the drill, from whence the seed is metered out for planting purposes.

This art has advanced, nevertheless, by the provisions of various devices for facilitating the loading and distributing of the seed into the seed box, including but not limited to: lift augers for transferring seed from a ground level to one end of the seed box, which lift augers may be straight or angular for storage purposes; and seed box extensions with cross augers associated therewith for more quickly and evenly distributing the seed grain throughout the seed box, or with elevated cross augers extended above the seed box for controlled filling thereof.

Although these prior art devices provide definite improvements over the common practice, there is still room for further innovations in this field which would more greatly facilitate the loading and controlled, uniform distribution of seed into the seed box, and facilitate further the transportation of the equipment in combination with the seed drill in a manner which would not increase the overall height and width dimensions of the seed drill.

SUMMARY OF THE INVENTION

The present invention is provided for use with an agricultural implement, such as a drill manufactured and sold by Deere & Company under Model No. 750 and termed "No Till Drill," having a normally horizontally disposed frame carried by wheels and towed by a prime mover such as a farm tractor, and with a particulate material (seed grain) carrying hopper mounted upon and extended laterally substantially the entire width of the frame.

The combined lift auger and hopper extension assembly of this invention comprises an elongated container mounted upon and in fluid communication with the implement hopper for increasing the material carrying capacity of the hopper; a second container secured to one side of the first container and in fluid communication therewith, an auger unit rotatably mounted within the second container and extended the length thereof and the length of the first container, a seed inlet box mounted on the second container for passing grain into the center of the second container for transfer by the auger unit to both ends of the second container for uniform movement into the first container; and a lift auger unit having an elongated auger with a seed receiving hopper at one end and a spout at the other end, the lift auger unit mounted on a frame supported base for movement about both vertical and horizontal axes for positioning the seed receiving hopper at a ground position for receiving seed for transfer by the auger unit upwardly to the spout for discharge into the seed inlet box, and a slide mechanism for interconnecting the lift auger to the base for providing a sliding movement of the lift auger to a storage position supported on the frame parallel the seed hopper and below same such as to lie generally within the width and height confines of the implement frame and seed hopper.

It is an object of this invention to provide a loading device for grain drills and the like which increases the planting capacity of the grain drill with a minimal modification.

Another object of this invention is to provide a loading device which delivers seed to the grain drill from a ground seed receiving position by a lift auger unit, thus reducing immeasurably the labor required to fill the grain drill with seed for planting.

Yet another object of this invention is to provide a loading device for center filling a secondary seed hopper for simultaneous delivery of the seed to both ends of the seed hopper for an even, uniform delivery of the seed into the seed hopper, another advantage being a reduction of seed damage.

Still another object of this invention is to provide a loading device having a spring-assisted lift auger device whereby the lift auger can easily be moved between a transport position in front of the seed hopper and across the width of the seed hopper for compact transportation, to a use position with a seed receiving end on the ground.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 5 is an enlarged front elevation view of a detail of the FIG. 4 disclosure with certain parts foreshortened and broken away for clarity of illustration;

FIG. 6 is an elevational view as taken along the line 6—6 in FIG. 5;

FIG. 7 is a vertical sectional view as taken along the line 7—7 in FIG. 6;

FIG. 8 is a vertical sectional view as taken along the line 8—8 in FIG. 5;

BEST MODE FOR CARRYING OUT THE INVENTION

Figure 1:
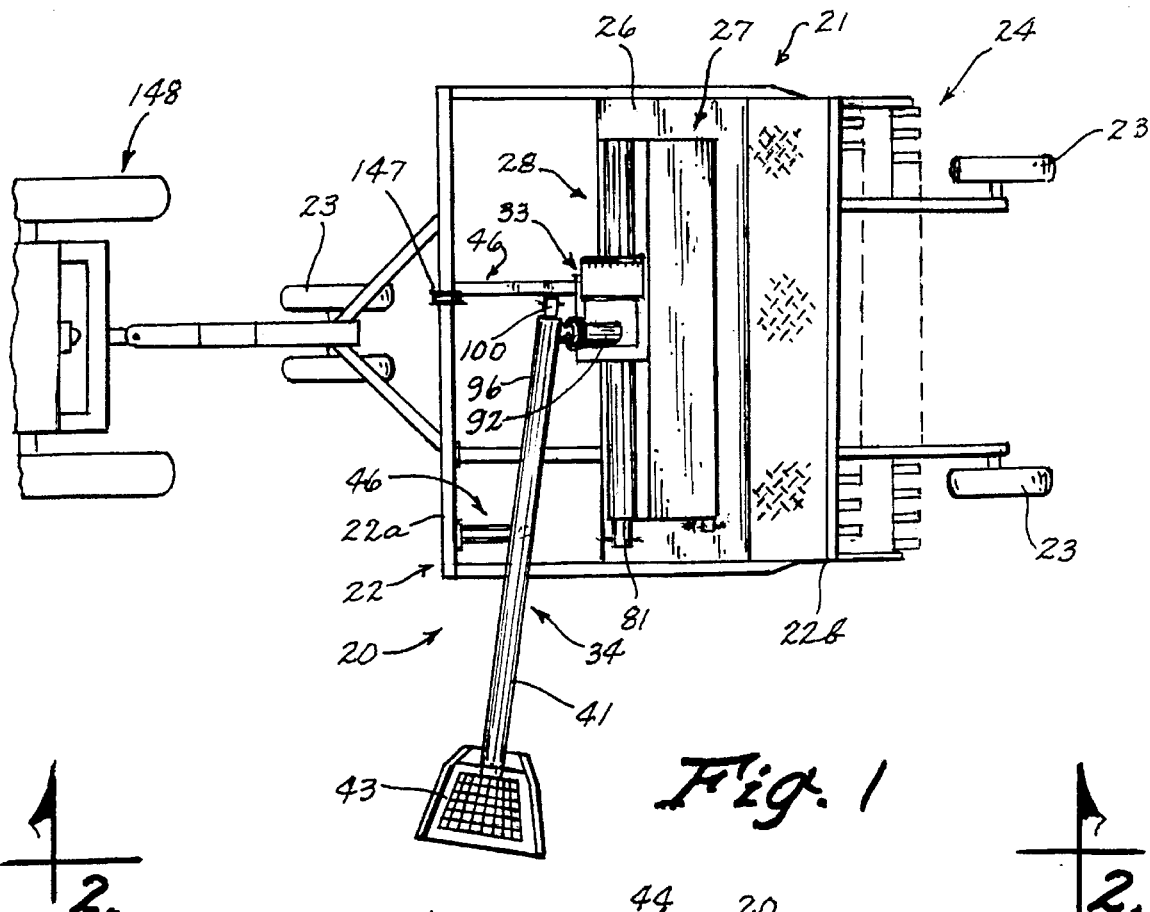
FIG. 1 is a plan view of a grain drill attached to a tractor prime mover to which the lift auger and hopper extension assembly is shown incorporated.
Figure 2:
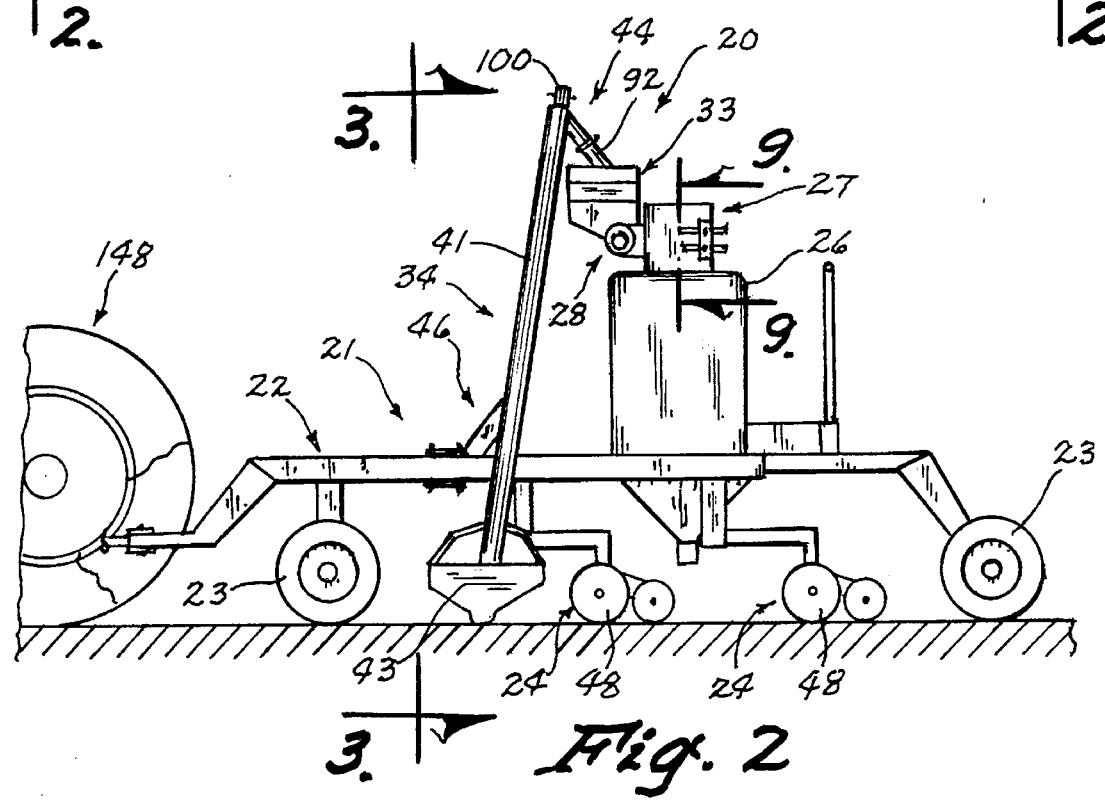
FIG. 2 is a side or end elevational view of the structure of FIG. 1, as taken along the line 2—2 in FIG. 1, with certain parts broken away.

Referring to FIGS. 1 and 2, the seed drill filling apparatus, more specifically the lift auger and hopper extension assembly of this invention is shown generally at (20), mounted on a drill implement such as that manufactured by Deere & Company and termed the 750 Series No-Till Drill (21), or the like. The drill (21) includes a frame (22) normally horizontally disposed and mounted on fore and aft wheels (23), with seed drilling gangs (24) suspended below the frame (22), and with a seed tank or hopper (26) mounted on top of the frame (22) and extended thereover, it being noted that the seed hopper (26) extends laterally across the frame (22) and generally at midpoint between the front member (22a) and the rear member (22b) (FIG. 1) of the frame (22).

The lift auger and hopper extension assembly (20) comprises generally an elongated hopper extension unit (27) mounted on the seed drill hopper (26) for increasing the material carrying capacity of the hopper (26), the unit (27) extended lengthwise the hopper (26) (FIG. 4) and having a length substantially the length of the hopper (26); a cross auger unit (28) (FIGS. 1, 2) including an elongated housing (29) with a pair of augers (31), (32) of opposite flighting mounted therein, the unit (28) mounted on one side of the hopper extension unit (27) and in fluid communication therewith, the cross auger unit (28) including a center fill hopper (33) (FIG. 4) mounted centrally of and on top of the housing (29) for receiving grain from the lift auger unit (34) and transferring it—evenly divided to the inner ends (36), (37) of the augers (31), (32) respectively, within the cross auger housing (29) for movement laterally outwardly toward the outer ends (38), (39) of the housing (29) for even distribution into the extension unit (27) from whence the grain falls evenly into the seed drill hopper (26).

The lift auger and hopper extension assembly (20) comprises further the lift auger unit (34) (FIGS. 1–4) including an elongated tube (41) with an auger (42) rotatably mounted therein and having a conventional seed receiving hopper (43) at one end of the tube (41) and a grain discharge spout device (44) at the opposite end for discharging grain into the center fill hopper (33); the auger tube (41) being mounted on a swivel base unit (46) mounted in turn on the drill frame (22) and providing movement of the auger tube (41) about both vertical and horizontal axes. By further provision of a slide mechanism (47) interconnecting the lift auger tube (41) to the swivel base unit (46), the auger tube (41) is movable from a use position (FIGS. 1–3) wherein the auger tube hopper (43) is in a ground engaged position for receiving grain for augered movement upwardly to the discharge spout device (44), to a generally horizontal position where, by sliding the auger tube (41) relative to the stationary slide mechanism (47), the auger tube (41) is positioned alongside, extended parallel and in front of the seed drill hopper (26) in a stow or transport position. Referring to FIG. 4, it will be noted the length of the auger tube (41), including the hopper (43) and spout device (44), is generally equal the width of the drill frame (22), and is disposed not higher than the seed drill hopper (26).

Although not shown, the drill implement (21) has the capability of metering seed from the seed hopper (26) downwardly to the seed drilling gangs (24) for placement in furrows formed within the ground by disk openers (48) (FIG. 2) and also has the capacity of transferring fertilizer from a tank (not shown) placed adjacent the seed hopper (26) for application between the seeding rows formed by the drilling gangs (24) in no-till conditions.

Figure 10:
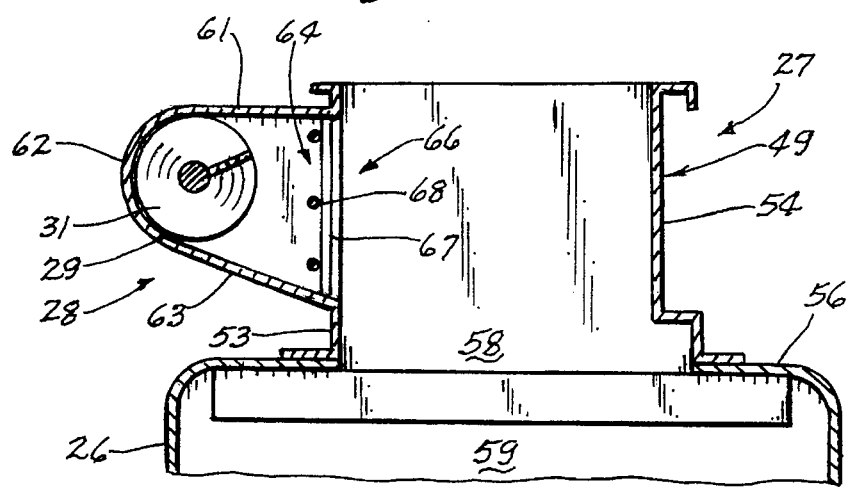
FIG. 10 is a vertical sectional view as taken along the line 10—10 in FIG. 9A.

More particularly, the extension hopper unit (27) comprises an elongated, rectangular container (49) having opposed end walls (51), (52) (FIG. 4) with opposed front and rear walls (53), (54) (FIG. 10), the container (49) mounted on top (56) of the seed hopper (26), and further with a lid removable or pivotally operable as desired. The container (49) is further provided with an open base (58) (FIG. 10) in fluid communication with the upper, open area (59) of the seed hopper (26). The provision of the hopper extension unit (27) increases the capacity of the drill seed hopper (26) approximately twenty percent.

The cross auger unit housing (29) (FIGS. 1 and 4) has a length comparable to that of the seed hopper (26) and in cross section (FIG. 10) has a C-shape with a top (61), rounded outer wall (62), base (63), and an open inner side (64) formed by the top (61) and base (63) secured to the front wall (53) of the extension unit container (49) with a like open space for fluid communication therebetween. A safety grate (66) comprised of vertical and horizontal rods (67), (68) respectively, and leaving multiple openings (69) is secured substantially the entire length of the opening (64). Vertical elements (71) (FIGS. 9 and 9A) are secured to the grate (66) at laterally spaced locations and have vertical elongated slots (72) for adjustably fastening by fasteners (73) an elongated, granular flow control gate or door (74) having either a straight or irregular, such as scalloped, lower edge (76) thereto; a door (74) disposed to either side of the center of the housing (29) whereat the two augers (31), (32) are joined.

Figure 9:
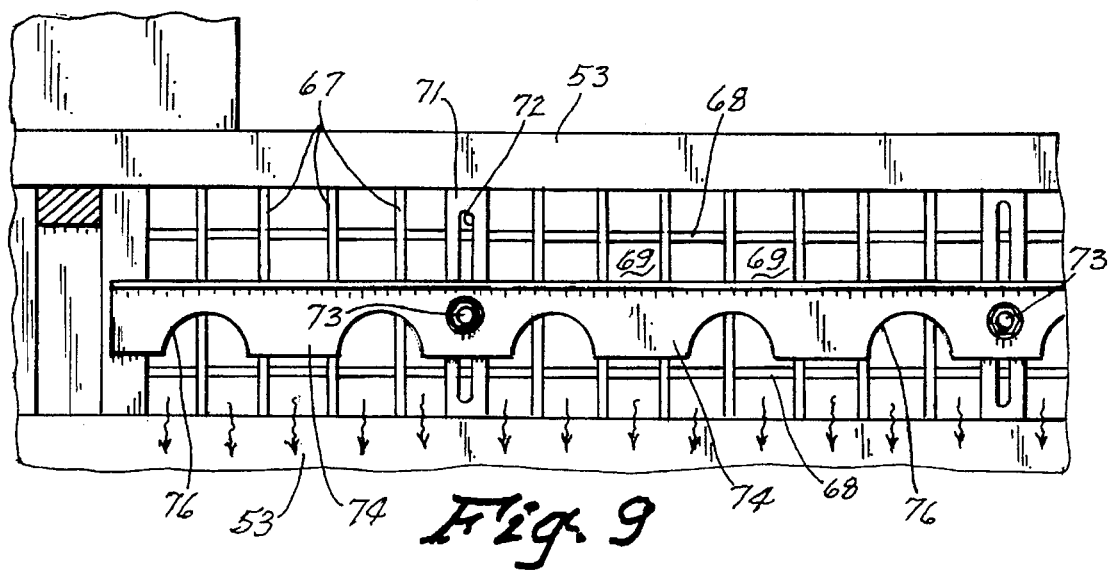
FIGS. 9 and 9A are vertical elevational views taken along the lines 9—9 in FIG. 2, the views being separated due to drafting requirements.
Figure 9A:
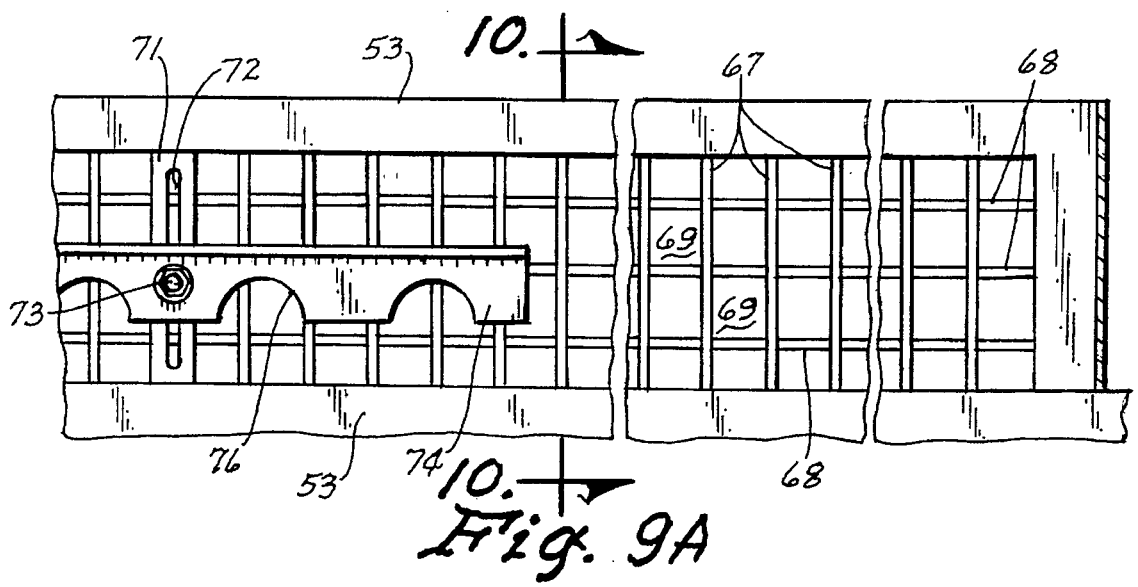

By providing for vertical adjustment of the doors (74), and with their location extended outwardly from the housing center but not necessarily the entire width of the housing (29) (See FIG. 9A), an even distribution of grain as moved laterally outwardly by the reverse or opposed flighting augers (31), (32) is achieved from the cross auger housing (29) into the extension container (49). For example, simply moving the doors (74) downwardly to a position as shown in FIGS. 9, 9A, limits the flow of grain into the center of the hopper container (49) and the seed drill hopper (26).

The augers (31), (32) have their inner ends connected together and rotatably supported at a mounting bracket and bushing, the bracket secured centrally of an upright support secured in turn to the cross auger housing (29), and have their outer ends (not shown) rotatably mounted appropriately at the outer wall ends (38), (39) (FIG. 4) of the housing (29), one end rotatably driven by a hydraulic motor (81) of appropriate capacity secured to the housing end wall (39). As mentioned hereinbefore, the center fill hopper (33) (FIGS. 1–4) is mounted centrally of the cross auger housing (29), and is rectangular in shape having end walls (82), (83) and side walls with an open base for fluid communication with a central opening formed in the housing (29), and with a movable lid (89) (FIG. 3) for permitting entry therein of the lift auger discharge spout device (44) (FIG. 9). To aid in distributing grain evenly to both ends (36), (37) of the cross augers (31), (32), an inverted V-shaped member is mounted within the hopper (33), extended laterally and normal to the extent of the augers (31), (32) and mounted directly above and generally bisecting the central opening. The flow divider member is mounted to extend directly over the bushing unit so as to divide grain moving through the hopper (33) evenly to the inner ends of the cross augers (31), (32), thereby ensuring an even and uniform distribution of the grain into the cross auger housing (29).

The lift auger discharge spout device (44) (FIG. 4) includes a cylindrical spout (92) mounted by a swivel clamp unit (93) for rotatable connection with a cylindrical stub (94) integral with one end (96) of the lift auger tube (41). Within the spout (92), a flat collector plate is secured, having its lower edge engaging an inverted V-shaped flow diverter secured across the inner base of the spout (92), this arrangement providing an even discharge of grain from the spout (92) into the center fill hopper (33). To rotate the lift auger (42), a hydraulic motor (100) of appropriate capacity is mounted at the tube end (96). The lift auger unit (34)

includes further an elongated slide track (101) (FIGS. 5–8) which comprises a pair of interconnected plates (102), (103), each with an upper flange (104) secured to an underside of the auger tube (41), and each with an outurned lip (106) for co-action with the slide mechanism (47) as described hereinafter.

Referring to FIGS. 3 and 5–8, it will be seen that the swivel base unit (46) includes a mounting bracket unit (107) for adjustable attachment to a frame member (108) of the implement frame (22), with an arm (109) extended rearwardly to support a vertically disposed swivel base (111). The base (111) rotatably supports a swivel tube (112) for rotation about a vertical axis. The upper end of the tube (112) has integral therewith an elongated bushing (113), (114) on opposite sides of the tube (112) for receiving an elongated tube (116), the tube (116) acting as a bushing, extended therethrough and interconnected to the slide mechanism (47) by an elongated cap screw fastener (117), whereby the slide mechanism (47) and the lift auger tube (41) and associated parts are movable about a horizontal axis relative to the swivel base unit (46) and in a vertical plane.

The slide mechanism (47) (FIGS. 4–7) slidably supports the lift auger tube (41) and comprises a roller track weldment (115) including a pair of elongated plates (118), (119) (FIGS. 5 and 6) arranged in laterally spaced, parallel relationship, interconnected at both ends, and spaced such as to embrace the opposed slide track outurned lips (106), and each plate (118), (119) having a flange (121) secured to each upper edge (122) such as to overlap and contain the slide track lips (106). Within the longitudinal extent of the flanges (121), a pair of longitudinally spaced identical roller devices (123), (124) are mounted. Each roller device (123), (124) includes a pair of rollers (126), (127) spaced intermediate by a spacer tube (128) and the rollers (126), (127) rotatably mounted on a pin (129) secured between the plates (118), (119) by conventional fasteners. It will be noted that the roller devices (122), (124) rotatably support the elongated lower outurned lips (106) of the auger tube slide track (101), and with the slide track (101) contained, the auger tube (41) is slidable longitudinally of the roller track weldment (115).

To assist manual movement of the auger tube (41) such that one person may easily move and adjust the position of the auger tube (41), a spring (131) is interconnected between a plate end (132) (FIG. 5) of the slide track (101), with an opposite end (133) of the spring (131) connected to a chain (134) adjustably looped over a notched end (136) of the roller track weldment (115), and secured thereby. As shown in FIG. 5, the auger tube (41) is in the stow position (FIG. 4) such that the spring (131) is in its normal, unextended condition. In this position, the auger tube (41) is locked against longitudinal, sliding movement by the semi-vertical position of a latch (137) (FIGS. 5 and 6) pivotally mounted by a pin (138) (FIG. 5) between the ends (139) of the plates (118), (119) opposite the notched end (136). The latch (137) thus blocks movement from left to right as viewed in FIG. 5 of the auger tube (41) due to the end plate (132) lower edge (141) depending below the upper edge (142) of the latch (137). Further, the latch (137) is prevented from rotating out of its position by a stop element (143) (FIG. 5) secured between the plates (118), (119), and by a removable, L-shaped pin (143).

Figure 3:
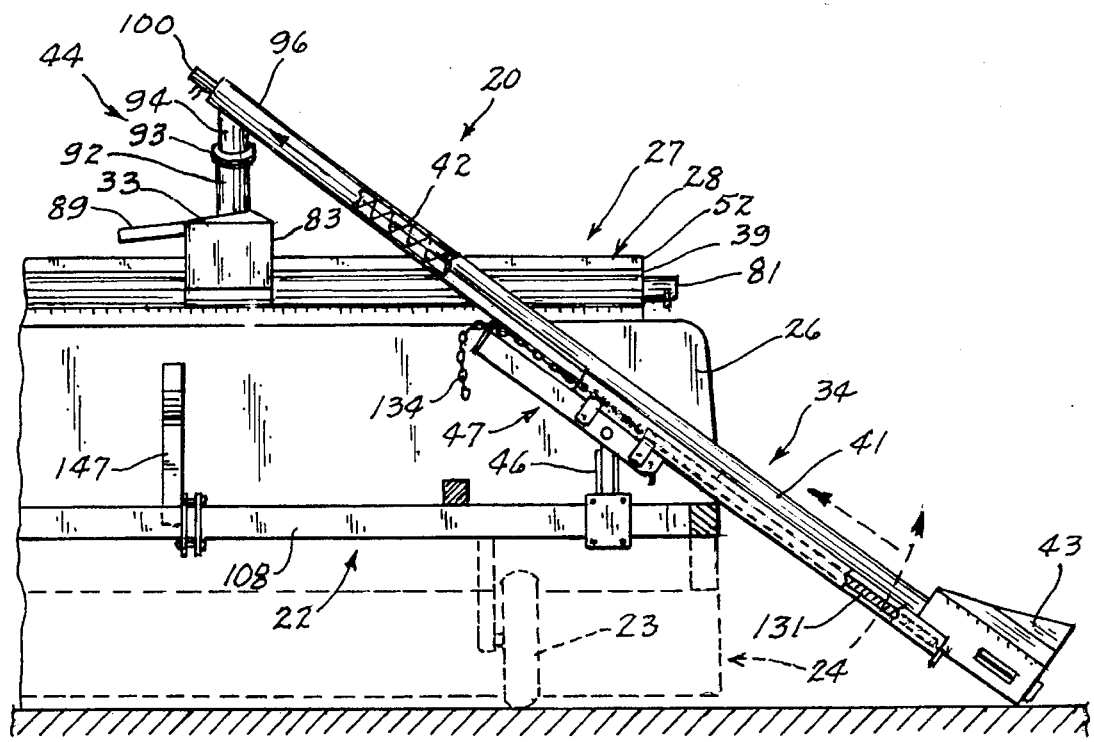
FIG. 3 is a fragmentary front elevational view as taken along the line 3—3 in FIG. 2, and showing the lift auger device in a use position, with certain parts broken away.
Figure 4:
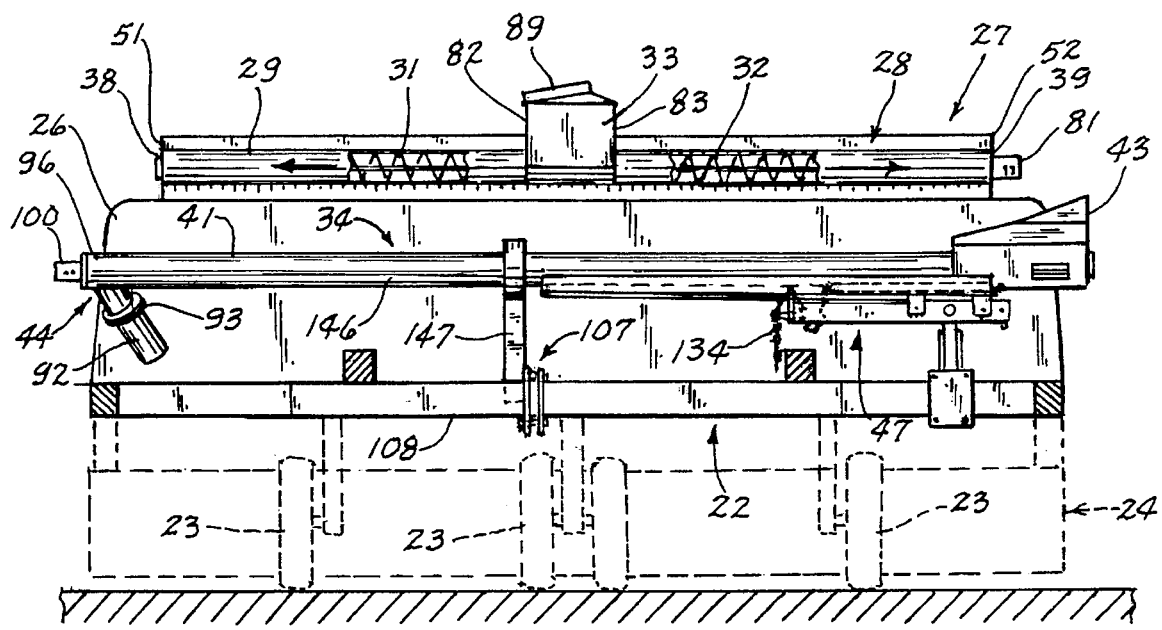
FIG. 4 is a front elevational view of the grain drill and with the lift auger device moved to a storage position for transport or non-use purposes.

Upon removal, however, of the latch pin (143) and a manual flip of the latch (137) to the (dotted line) horizontal position (FIG. 5), the auger tube (41) can be manually slid rearwardly on the slide mechanism to a position as best shown in FIG. 3 and where the mass of the auger tube hopper (43) will hold the auger tube (41) in the use (load) position. After use, the auger tube (41) is pushed forwardly, aided by the spring (131), until the slide track end plate (132) trips the latch (137) and seats against the rear end (144) (FIG. 5) of the roller track weldment (115). With replacement of the latch pin (143), the lift auger unit (34) is placed in the stow position with the forward portion (146) of the auger tube (41) supported by a Y-shaped support bracket (147) (FIGS. 3 and 4) mounted on a frame member (108).

Although not described in detail, the hydraulic arrangement, including the two motors (81) for the cross auger reverse flighting units (31), (32), and motor (100) for the lift auger (42), is conventional, deriving fluid power from prime mover, such as a farm tractor (148). The lift auger (42), used for filling, may have a length of 15'3" with a 12" swivel spout (92). The auger tube (41) may have a 6" diameter, and the flighting of the auger (42) may either be of bristle with a 5½" diameter flighting consisting of a 4" diameter left hand wound screw with ¾" of durable bristle-like fingers around the outside leading edge to gently handle delicate grain; or the flighting may be of 0.105 thick by 5.0 inch diameter left hand wound steel flight welded to a 1.050 inch diameter shaft. The flighting specifications for the augers (31), (32) are the same, plus adding identical right hand windings for the reverse, opposed movement of grain. The recommended capacity for the lift auger motor (100) is 3.0 cubic inch displacement; and for the cross auger motor (81), a 10.0 cubic inch displacement.

Thus, it may readily be seen that the provision of the preferred embodiment herein achieves the aforementioned objectives of the invention. It is understood that suitable modifications may be made in the structure as disclosed, provided such modifications come within the spirit and scope of the appended claims.

We claim:

1. For use with an agricultural implement having a portable frame, and a particulate material carrying hopper mounted upon and extended laterally across the frame, the improvement comprising in combination:

means mounted upon the hopper for increasing the material carrying capacity of the hopper and having opposed ends;

cross auger means mounted adjacent said hopper capacity increasing means and fluidically connected therewith for moving material received by said cross auger means laterally outward from centrally of said hopper capacity increasing means toward said opposed ends for even distribution into said hopper; and lift auger means mounted on the frame for rotatable movement about stationary vertical and horizontal axes, said lift auger means including a lift auger for moving material from a position adjacent the ground upwardly for discharge therefrom into said cross auger means, said lift auger slidably movable relative to said vertical axis to a storage position extended laterally across the frame generally parallel the hopper.

2. The apparatus of claim 1, and further wherein said cross auger means comprises an elongated housing having opposed ends and a length approximately equal to the length of the hopper, mounted to one side of said hopper capacity increasing means and with an elongated first opening formed in a side of said housing for fluid communication with said hopper capacity increasing means, with a second opening formed centrally and within an upper surface of said housing for receiving material from said lift auger, and a reverse flighting auger mounted within said housing for moving material received through said second opening laterally toward both said housing opposed ends for subsequent movement through said first opening into said hopper capacity increasing means.

3. The apparatus of claim 2, and further wherein said lift auger has a discharge spout, and including means within said cross auger means for dividing a downwardly directed flow of material from said spout into said second opening.

4. The apparatus of claim 3, and further wherein a center fill hopper is mounted centrally on said cross auger housing and in fluid communication therewith, said second opening formed within an upper surface of said center fill hopper.

5. The apparatus of claim 4, and further wherein said flow controlling means includes an elongated gate element having upper and lower edges and secured to said housing and extended parallel said reverse flighting auger, and means for vertically adjusting said element relative to and within said first opening.

6. The apparatus of claim 5, and further wherein said reverse flighting auger, said first opening and said gate element are spaced laterally from each other, and from said hopper capacity increasing means.

7. The apparatus of claim 1, and further wherein said lift auger means includes an elongated auger unit having a material receiving hopper at one end and said discharge spout at an opposite end, and including further base means mounted upon the implement frame for supporting said auger unit for movement about horizontal and vertical axes.

8. The apparatus of claim 7, and further wherein. said lift auger means includes a slide mechanism mounted upon said base means, a guide track mounted on said auger unit and connected to said slide mechanism for slidable movement relative thereto longitudinally of said slide mechanism.

9. The apparatus of claim 8, and further including means for biasing said elongated auger unit toward said storage position, said biasing means interconnected between said slide mechanism and said guide track.

10. The apparatus of claim 1, and further wherein said lift auger means lies substantially within the width confines of the portable frame in said storage position.

11. The apparatus of claim 10, and further wherein said lift auger means lies within the height confines of the portable frame and hopper in said storage position.

12. For use with an agricultural implement having a portable frame, and a particulate material carrying hopper mounted upon and extended laterally across the frame, the improvement comprising:

lift auger means mounted on the frame for rotatable movement about stationary vertical and horizontal axes, said lift auger means including a lift auger for moving material from a position adjacent the ground upwardly for discharge therefrom into the hopper, said lift auger slidably movable relative to said vertical axis to a storage position extended laterally across the frame generally parallel the hopper.

13. The apparatus of claim 12, and further wherein said lift auger means includes an elongated auger unit having a material receiving hopper at one end and said discharge spout at an opposite end, and including further base means mounted upon the implement frame for supporting said auger unit for movement about horizontal and vertical axes.

14. The apparatus of claim 13, and further wherein said lift auger means includes a slide mechanism mounted upon said base means, a guide track mounted on said auger unit and connected to said slide mechanism for slidable movement relative thereto longitudinally of said slide mechanism.

15. The apparatus of claim 14, and further including means for biasing said elongated auger unit toward said storage position, said biasing means interconnected between said slide mechanism and said guide track.

16. For use with an agricultural implement having a portable frame, and a particulate material carrying hopper mounted upon and extended laterally across the frame, the improvement comprising in combination:

means mounted upon the hopper for increasing the material carrying capacity of the hopper and having opposed ends;

cross auger means mounted adjacent said hopper capacity increasing means and fluidically connected therewith for moving material received by said cross auger means laterally outward from centrally of said hopper capacity increasing means toward said opposed ends for even distribution into said hopper; and further wherein said cross auger means comprises an elongated housing having opposed ends and a length comparable the length of the hopper, mounted to one side of said hopper capacity increasing means and with an elongated first opening formed in a side of said housing for fluid communication with said hopper capacity increasing means, with a second opening formed centrally and within an upper surface of said housing for receiving material from an external source, and a reverse flighting auger mounted within said housing for moving material received through said second opening laterally toward both said housing opposed ends for subsequent movement through said first opening into said hopper capacity increasing means.

17. The apparatus of claim 16, and further wherein said flow controlling means includes an elongated gate element having upper and lower edges and secured to said housing and extended parallel said reverse flighting auger, and means for vertically adjusting said element relative to and within said first opening.

18. The apparatus of claim 17, and further wherein said reverse flighting auger, said first opening and said gate element are spaced laterally from each other, and from said hopper capacity increasing means.

* * * * *